KITCHEN & NASH.
Portable Gas Apparatus.
No. 84,283.
Patented Nov. 24, 1868.
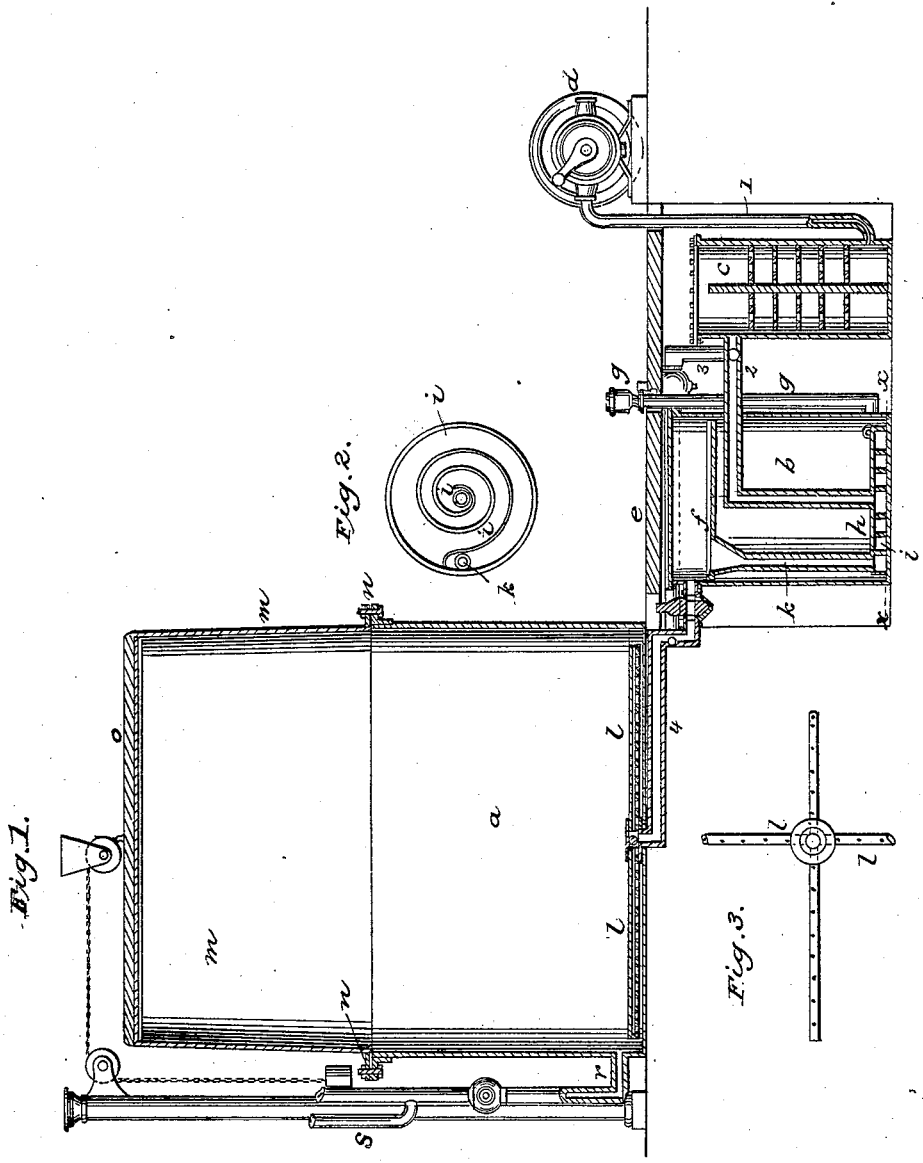

UNITED STATES PATENT OFFICE.

GEORGE H. KITCHEN, OF NEW YORK, AND SCOTTO C. NASH, OF BROOKLYN, N. Y.

IMPROVED PORTABLE GAS APPARATUS.

Specification forming part of Letters Patent No. 84,283, dated November 24, 1868.

*To all whom it may concern:*

Be it known that we, GEORGE H. KITCHEN, of the city and State of New York, and SCOTTO C. NASH, of the city of Brooklyn, in the county of Kings and State of New York, have invented, made, and applied to use a certain new and useful Improvement in Portable Gas Apparatus; and we do hereby declare the following to be a full, clear, and exact description of the said invention, reference being had to the annexed drawings, making part of this specification, wherein—

Figure 1 is a general vertical section of our said apparatus, and Fig. 2 is an inverted plan of the carbonizer at the line $x\ x$, and Fig. 3 is an inverted plan of the distributer within the gas-holder.

Similar letters denote the same parts.

Portable gas apparatus has heretofore been made for carbonizing atmospheric air by the vapors of gasoline or similar volatile hydrocarbons; but two difficulties have been experienced—the first from the formation of water by the condensation of the moisture carried in with the atmosphere, the second from the gasoline being unequally evaporated, the air taking away the most volatile portions, and then the evaporation taking the less volatile portions of the liquid, rendering the light unequal in intensity.

Our invention is an improvement upon the portable gas apparatus heretofore made, and relates to a peculiar construction of carbureting apparatus that causes the bubbles of air to pass horizontally, or nearly so, through the bottom portion of the gasoline contained in a vessel, and thereby evaporate only that portion of the liquid hydrocarbon. We also arrange our pump, carbureting apparatus, and gas-holder so that the air which is passed directly into the gas-holder to dilute the vapors therein goes through the same distributing-pipe that the carbonized vapors have passed through, thereby insuring great uniformity in the mixing of the air and vapors in the gas-holder.

In the drawings, $a$ represents the vessel forming the gas-holder; $b$, the vessel containing the gasoline or other hydrocarbon; $c$, the vessel containing materials for removing moisture from the air, and $d$ the rotary or other pump for forcing air into the apparatus.

We have shown the vessels $b$ and $c$ as below the floor $e$, in order that the vessel $b$ especially may be but little exposed to changes of temperature.

The pipe 1 from the pump to the vessel $c$ may pass into the same either near the top or the bottom, the pipe 2 passing off from the opposite end to the vessel $b$; and 3 is a branch and cock to the pipe 4 from the vessel $b$ to the gas-holder $a$, so that air can be passed through the gasoline-vessel $b$ or go directly to the gas-holder $a$, in order that the proper proportion of atmosphere and hydrocarbon vapor may be obtained.

In the vessel $c$ we introduce a series of diaphragms or perforated shelves, upon which soda, potash, lime, or other absorbent of moisture is placed, for the air to circulate through the same in reaching the generator or the gas-holder, and thereby be deprived of moisture.

The vessel $b$ is formed with a diaphragm, $f$, beneath which the gasoline is contained, the same being supplied when exhausted through a tube, $g$, that for convenience may rise through the floor $e$, and contain a float and tell-tale rod to indicate the proper height of the liquid in the vessel $b$.

The tube 2, that conveys air into the gasoline, passes down beneath the diaphragm $h$ into a spiral channel formed by said diaphragm and a pendent spiral plate, $i$, the end of the spiral terminating at the rising tube $k$, that passes with a funnel-shaped upper end through the diaphragm $f$. By this construction the air is brought into contact with the gasoline in the lower part of the vessel $b$ and the main body of the gasoline remains quiescent, the air traveling in the upper part of a spiral channel that is open at the bottom, so that the gasoline is self-supplying as evaporated; but only a portion of the gasoline is being operated upon at one time, and that is the lower portion of the liquid, which generally is the least volatile. The object sought is to prevent evaporation from the surface of the gasoline; but to prevent the liquid from being forced up the pipe $k$ by any accumulation of pressure of gas below the diaphragm $f$, said diaphragm may have a small hole in it, or not be made entirely gas-tight.

If desired, a vent-tube may be used, extending from the diaphragm $f$ through the head of the vessel $b$, with a cock at its upper end and a hole in its side, above the diaphragm $f$ and below the head, for the aforesaid object.

The gas passes through the pipe 4 into the gas-holder $a$; and $l$ is a distributer, formed of radial pipes extending from the pipe 4 horizontally within the lower part of the vessel $a$, with holes in the under side, so that the air, when it is passed into the holder, shall aid in evaporating any gasoline or other liquid hydrocarbon that may have condensed and remains in the gas-holder, and the air in passing into the gas-holder is very uniformly distributed by the tubes $c$, thereby avoiding the difficulties heretofore experienced where the air is supplied into the gas-holder through an ordinary pipe, and the gas hence is uniform in our apparatus, and the vessel $b$, standing at a lower level than the holder $a$, allows any accumulation of gasoline to run back through the pipe 4 into the vessel $b$.

The gas-holder $a$ is provided with a cylindrical flexible bag, $m$, that is attached at one edge to the rim $n$ of the vessel $a$ and at the other edge to the head $o$ of the gas-holder, that is fitted to move up and down, being sustained by chains and counter-weights $p$ or similar devices. By this construction a dry gas-holder is formed that is not subject to injury from frost and will hold a much larger amount of gas in the same space than the usual gas-holders made tight by water.

The pipe $r$ leads the gas away to the usual tubing and burners, and upon the pipe $s$ a test-burner may be employed.

Our apparatus is very compact, simple, durable, entirely safe, and the quality of the gas can be controlled at pleasure, besides which the proportion of carbonaceous vapors mixed with air will remain uniform, and hence the light will be the same whether the apparatus contain fresh gasoline or that which is nearly exhausted.

We are aware that gasoline has been supplied into a chamber containing a volute or space above the surface of the gasoline for the air to pass through; also, that distributing-pipes have been used for the supply of air to the bottom of a vessel containing hydrocarbon for its evaporation. The gas-holders for the gas made from gasoline have heretofore been provided with a water-vessel; but this is subject to being frozen in winter because the entire apparatus is cold, instead of being warmed up in the manufacture of the gas, as with coal-gas. Our combination of apparatus prevents injury by frost and requires less attention.

What we claim, and desire to secure by Letters Patent, is—

1. A diaphragm, $h$, introduced in the lower part of the vessel containing the liquid hydrocarbon, so that said liquid shall freely pass into and fill the space below said diaphragm, in combination with a pipe supplying air below said diaphragm and a pipe conveying away said carbureted air, substantially as set forth, whereby said diaphragm directs the bubbles of air as they pass through the lower parts only of the liquid hydrocarbon, and they do not disturb or vaporize the upper portion of the same, as set forth.

2. The diaphragm $h$ and spiral flange, forming a channel in which the bubbles of air travel, in combination with the pipes 2 and $k$ and diaphragm $f$ within the gasoline-vessel $l$, substantially as and for the purposes set forth.

3. A gas-holder provided with perforated distributing-pipes in the lower part, in combination with the carbureting-vessel, pump, and pipes, arranged substantially as specified, so that the air that is forced directly into the gas-holder to dilute the gaseous hydrocarbon will enter by the same distributing-pipes that have supplied the carbureted air, in order that the contents of the gas-holder may be mixed together with uniformity, substantially as set forth.

4. The combination of a gas-holder formed of a flexible bag with a pump and carburetting-vessel, substantially as and for the purposes specified.

In witness whereof we have hereunto set our signatures this 29th day of July, A. D. 1868.

GEO. H. KITCHEN.
SCOTTO C. NASH.

Witnesses:
CHAS. H. SMITH,
GEO. D. WALKER.